Nov. 16, 1926.
A. G. SLATER
1,607,487
DIRECTION INDICATOR
Filed May 13, 1922     3 Sheets-Sheet 1
Fig. 1.
Fig. 2.
Fig. 6.
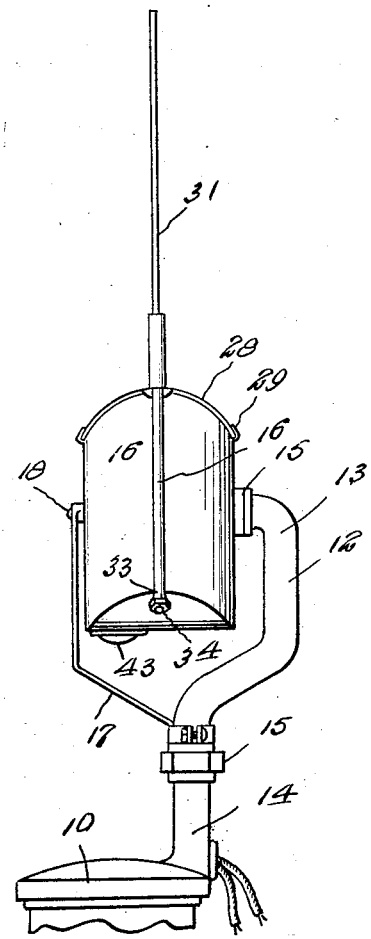
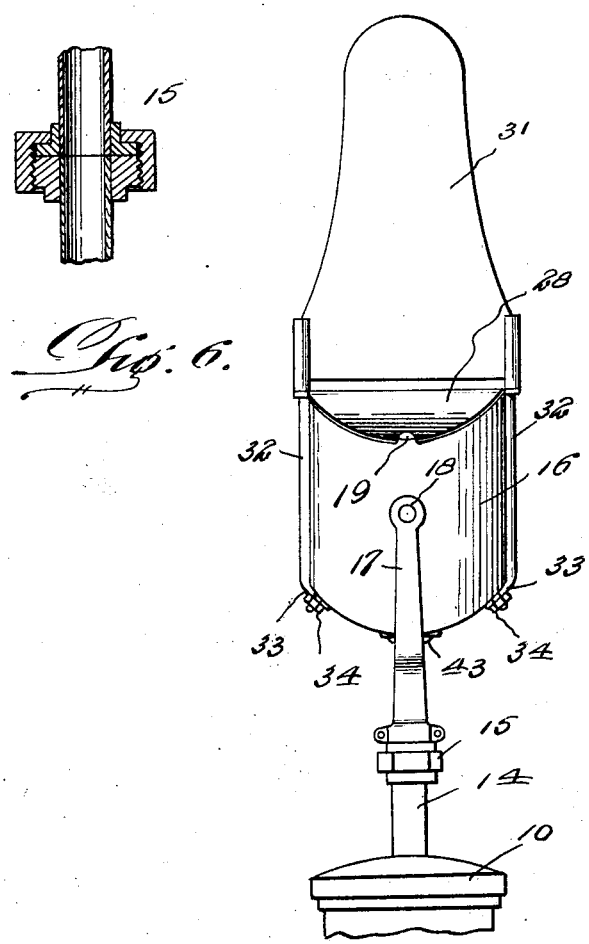
A. G. Slater,
INVENTOR
BY Victor J. Evans.
ATTORNEY
WITNESS:

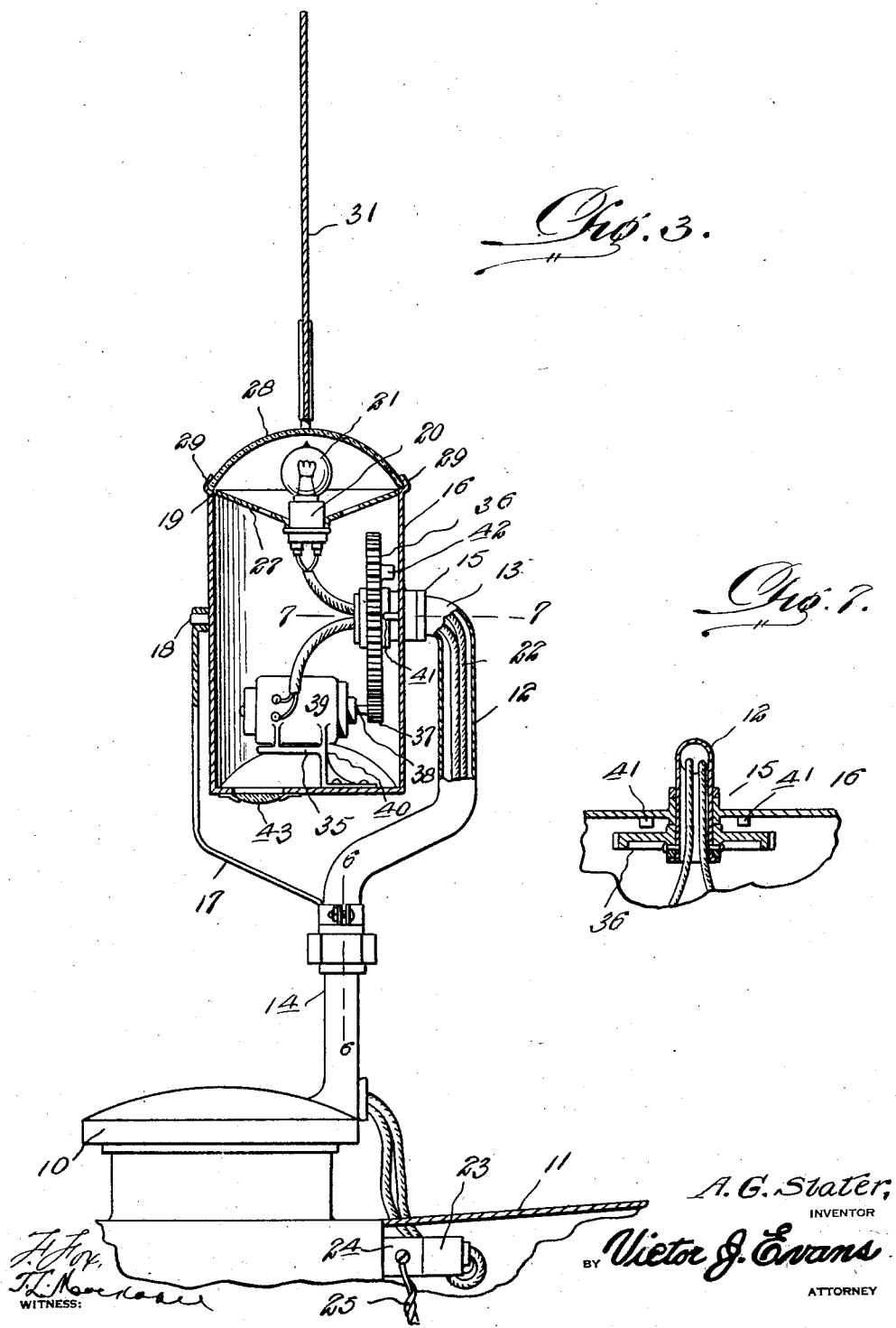

Nov. 16, 1926.  
A. G. SLATER  
1,607,487  
DIRECTION INDICATOR  
Filed May 13, 1922  3 Sheets-Sheet 3

A. G. Slater,
INVENTOR
BY Victor J. Evans
ATTORNEY

Patented Nov. 16, 1926.

1,607,487

UNITED STATES PATENT OFFICE.

ALBERT G. SLATER, OF MILES CITY, MONTANA.

DIRECTION INDICATOR.

Application filed May 13, 1922. Serial No. 560,639.

My present invention has reference to a direction signal for automobiles.

My object is to arrange over the hood, or if desired, on the filler spout for the radiator of an automobile or other convenient place, a signal, which is in normal vertical non-signalling position and which is operable from the dash forward of the driver's seat to turn the same laterally toward the right or left hand side of the machine and when so turned to direct rays of light therefrom, so that warning will be given to vehicles either approaching or following the machine on which the device is attached, with respect to the direction of travel to be taken by the machine in the dark, the signal, of course, being apparent without illumination in daylight.

It is a further object to produce a direction signal for automobiles which shall be illuminated in night driving and which will direct rays of light to either side of the machine, whereby the driver will observe road conditions to the side of his machine and steer the same accordingly, while at the same time vehicles approaching the machine will be notified of the exact position of the machine on the road and the direction which it is to travel, should it be found necessary or desirable to make a turn on the road.

A still further object is to produce a direction signal that is visible in both daylight and night time, and is particularly devised to warn vehicles approaching the machine upon which the device is installed of the intention of the driver of the machine to turn or of the position of the machine on the road and which may be installed over the hood of the engine in such a manner as to not interfere with the raising or lowering of the hood, or if desired, the removal of the hood from the engine.

It is a still further object to produce a signal of this character which can be detached from its support and employed as a trouble lamp.

It is a still further object to produce an electrically operated direction signal which shall be of a simple construction, may be cheaply manufactured and marketed, easily installed upon an automobile and thoroughly efficient for the purpose for which it is devised.

The foregoing and other objects which will appear as the nature of the invention is better understood, may be accomplished by a construction, combination and operative association of parts, such as is disclosed by the drawings which accompany and which form part of this specification.

In the drawings:—

Figure 1 is a side elevation of a portion of an automobile illustrating the application of the improvement thereon.

Figure 2 is a front elevation thereof.

Figure 3 is a sectional view on the line 3—3 of Figure 2.

Figure 6 is a sectional view on the line 6—6 of Figure 4.

Figure 7 is a sectional view on the line 7—7 of Figure 4.

The signal which may be placed upon any convenient portion of an automobile is shown for purposes of illustration as attached to the radiator cap, the latter being indicated at 10, while a portion of the hood of an automobile is shown at 11.

Figure 4:
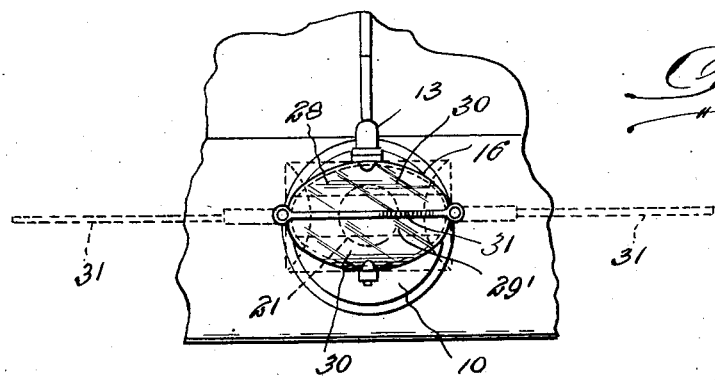
Figure 4 is a plan view with parts broken away and parts in section and showing by the dotted lines the signal swung laterally toward each side of the machine.
Figure 5:
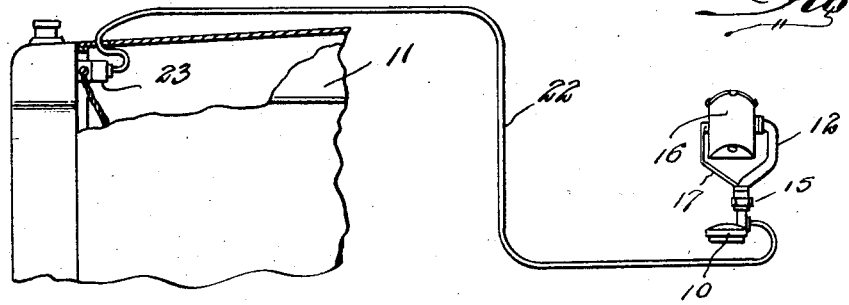
Figure 5 is a side elevation illustrating the manner in which the device may be employed as a trouble lamp.
Figure 8:
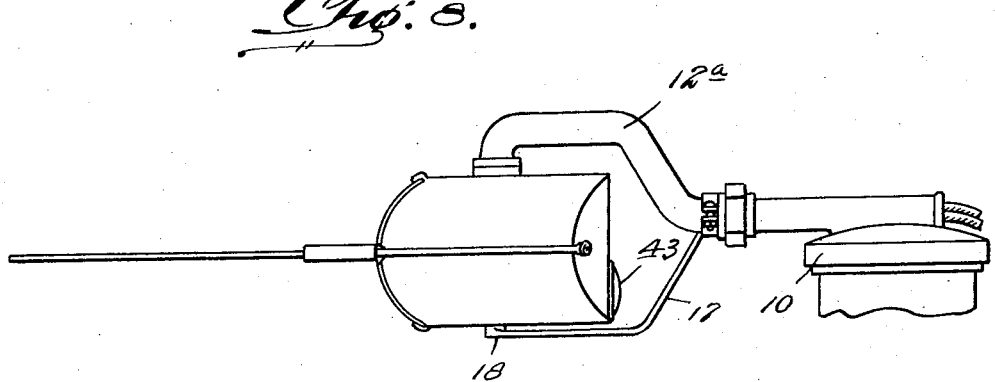
Figure 8 is a view similar to Figure 1 showing a modified form of the invention.

The signal which is supported by an arm or bracket 12, may be vertically arranged as shown in Figures 1 to 7 of the drawings, or it may be horizontally arranged as shown in Figure 8.

The bracket 12 is of tubular construction and is substantially Z-shaped and includes an elbow 13 and an elbow 14, which are connected as shown at 15 so as to provide for relative rotary movement. The elbow 14 is mounted for pivotal movement as shown at 15 and as the signal casing 16 is carried at the upper outer end of the bracket, a universal movement is provided for. To further support the casing 16, the bracket has extending therefrom a substantially L-shaped arm 17, which has a pivotal connection 18 with the casing 16 so that the latter is moved for pivotal movement between a fork or yoke.

The casing 16 is open at one end 19 and is concaved or rounded inwardly from its ends to the center of the sides thereof and located within this casing is a socket 20 which receives an electric bulb 21, to which current is supplied by suitable conductors 22 which lead to a plug 23, the latter being removably secured within a socket 24 and having electrical connection with a suitable source of current by means of conductors 25, the current to the lamp being controlled by a switch 26.

The bracket or arm which supports the casing 16 may be detached by removing the radiator cap and by disconnecting the plug 23 from the socket 24, the said plug may be connected to another socket on the automobile and the signal used as a trouble lamp, or the cord or conductor 22 may be of such length as to permit of its use without removing the plug 23.

Located within the casing 16 is a convex reflector 27 and in the open end of the casing there is positioned a cross sectionally arranged lens 28. The lens 28 has its sides arranged downwardly from its ends and on the sides and on the ends at the open face or end of the casing there is provided catch elements 29, that engage the lens for holding the same in position within the open end of the casing. The lens 28 has its central portion transparent as at 29′ and upon opposite sides of this transparent portion there is provided translucent portions 30. These last named portions are provided for staining or otherwise coloring the lens, so that the rays of light deflected from the bulb through said lens, will be colored according to the color of the translucent portions 30. Extending beyond the end of the casing 16 is a signal bulb or arm 31, which is preferably in the nature of a flat plate which may be concaved from its inner end towards its outer end, with the last mentioned end rounded. At its inner edges, the blade has secured thereto arms 32, which have their inner ends rounded inwardly as at 33 and are provided with notches or openings for the passage of attaching screws or bolts 34. By attaching the blade to the casing in the manner just described, the blade may be removed and the lamp used as a trouble lamp, the rays of light being deflected by the translucent portions through the central transparent portion. When used as a trouble lamp, the plug 23 may be connected to another socket upon the automobile, if desired, or the length of the conductor 32 may be such as to permit of a relatively wide range of movement. When used as a signal, the rays of light passing through the transparent portions of the lens are directed against the sides of the blade and by the blade to the sides of the car, so that while the light is brilliant it is not dazzling to the eyes of the driver of an automobile, or to the eyes of the driver of an approaching vehicle. The rays will be directed a considerable distance to the sides of the automobile and will be therefore clearly visible from vehicles to the rear of the signal and will also tend to light the roadway upon each side of the vehicle so that the driver may easily determine how far he can approach the edge of the road, while the driver of an approaching vehicle may easily see how much room he has for passing.

For the purpose of normally maintaining the lamp and blade in a vertical position, the bottom of the casing is provided with a weight 35 and in order to move the lamp and blade to a substantially horizontal or signalling position, there is secured to the bracket or arm 12 within the casing 15, a spur gear 36. This gear engages and rotates a pinion 37 which is secured to the end of a shaft 38, of a motor 39, the latter being secured within the casing 16 by means of brackets or similar fastening devices 40. This motor is connected in a circuit (not shown) with the automobile battery and when the circuit is closed, the motor will operate to drive the shaft 38 so that the pinion 37 will travel around the gear 36, the distance of travel being determined by a lug 41 carried by the casing 16 which engages a stop 42 extending from the bracket 12. The signal is adapted to be moved either to the right or left and the casing 16 carries a stop 41 upon opposite sides of the stop 42 so that movement of the signal in either direction will be limited. The motor 39 is of the reversing type and may operate to move the signal in either direction.

The casing 16 is provided at the end opposite the lens 28 with an opening which is covered by a lens 43, the latter being preferably colored red. The reflector 27 is provided with suitable openings so that light from the lamp 21 may shine through the lens 43.

The signal is illustrated in Figure 8 as horizontally arranged. The construction is similar to that described in connection with the preceding form of the invention, except that the bracket arm 12ª is also horizontally arranged and the signal moves to the right or left in a horizontal position.

From the foregoing description, it will be seen that I have provided a comparatively simple, inexpensive and thoroughly efficient direction signal, which may be also employed as a trouble lamp. While the signal is shown as placed upon the hood and radiator cap of an automobile, it may be also placed upon the rear end of an automobile, so as to be more clearly visible to traffic at the rear. Where front and rear signals are used, one light switch and one motor switch will simultaneously control both signals.

The invention is susceptible of various changes in its form, proportions and minor details of construction and the right is herein reserved to make such changes as properly fall within the scope of the appended claim.

What I claim is:—

In a signal, a bracket arm including a substantially U-shaped portion, a clamp embracing the arm directly beneath said portion, an angular-shaped arm projecting outwardly and upwardly from said clamp and terminating directly opposite the U-shaped portion of the bracket, a lamp casing mounted for pivotal movement between the free ends of said arms, said U-shaped portion entering one side of the casing, a signal blade projecting from one end of the casing, a stationary gear arranged within the casing and supported by the adjacent bracket arm, a motor arranged within the casing and including the shaft, a pinion carried by the shaft and adapted to travel about said gear in either direction to impart pivotal movement to the casing, a stop lug projecting from one side of the gear, and lugs carried by the adjacent wall of the casing and adapted to singly engage the stop lug to limit the movement of the casing in either direction.

In testimony whereof I affix my signature.

ALBERT G. SLATER.